United States Patent Office

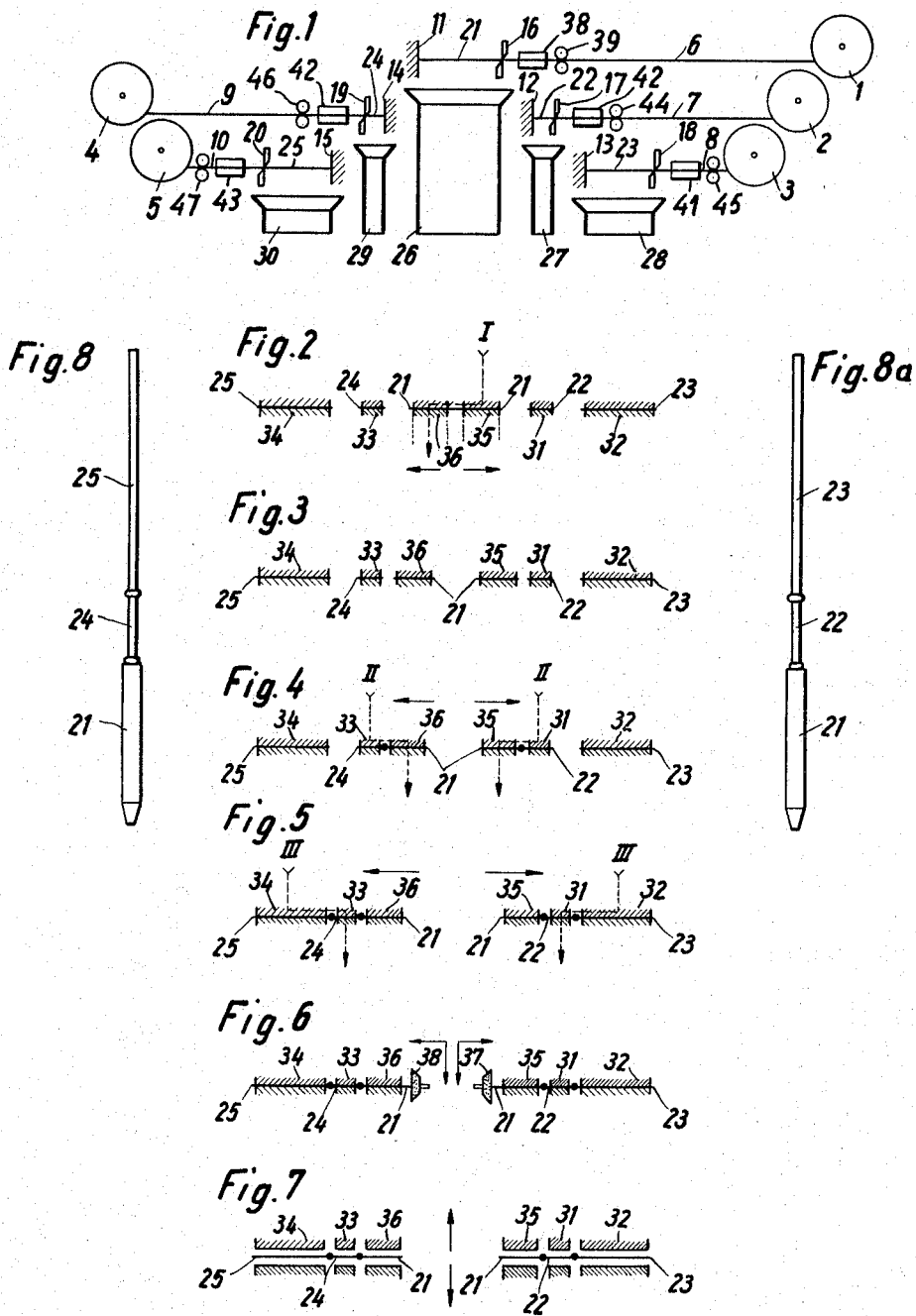

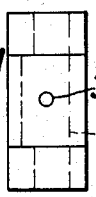
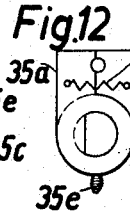
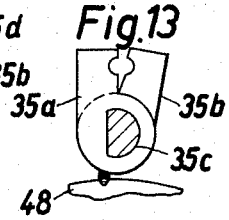
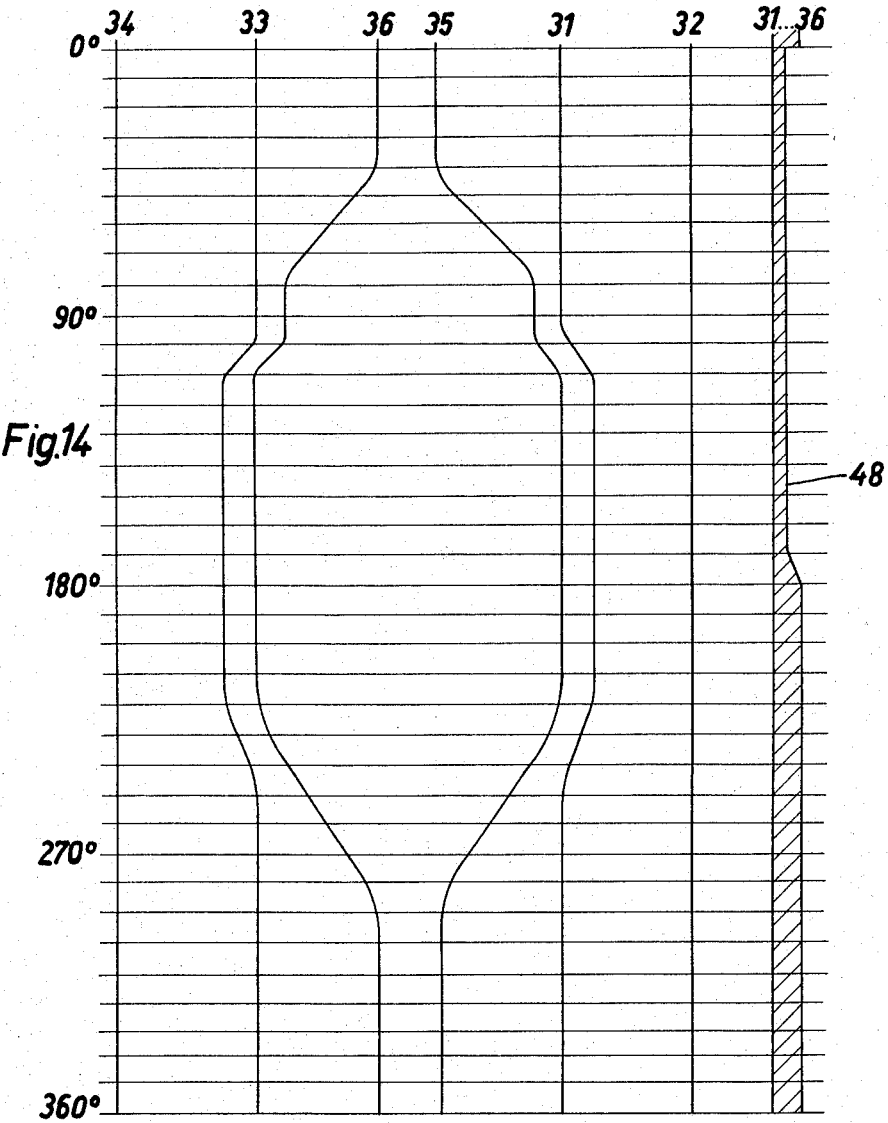

3,363,085
Patented Jan. 9, 1968

3,363,085
PROCESS AND APPARATUS FOR MANUFACTURING LEAD-IN CONDUCTORS FOR ELECTRONIC TUBES
Wolfgang Mötz, Badstrasse 23, Berlin 65, Germany
Filed Aug. 24, 1964, Ser. No. 391,503
8 Claims. (Cl. 219—104)

The invention relates to a method and arrangement for manufacturing lead-in conductors in three parts for the pressure discs of electronic tubes on a machine in which various wires are fed to severing devices from two opposite sides and in which the pin-shaped wire sections cut from the wires are gripped by conducting claws which are moved in a pre-selected rhythm, electric current impulses being supplied to these claws in a predetermined sequence so that the three parts are successively welded together.

With pressure discs for radio and television tubes and other components in high frequency engineering, one uses lead-in conductors made of three parts consisting of a nickel pin, a Finkh wire and a thinner nickel wire. The nickel pin serves as a socket pin and is introduced into the tube socket. Two constructions are usual: in the first, the end of the pin is rounded off, in the second, it forms a truncated cone. The second construction is preferable for introduction into the tube socket because it prevents distortion of the socket spring.

In hitherto usual manufacturing methods, the rounded shape is used since it is more advantageous for loading of magazines. Rounded ends are provided at both ends of the pin. The welding is effected in an automatic machine, the magazines of which are supplied with three individual parts, that is to say, the three wires are cut separately and the rounded ends must be rolled on the contact pin.

There are also known machines for the automatic welding of lead-in wires for electric light bulbs and similar vacuum vessels in which the wires supplied possibly from both sides and then cut, are intermittently gripped by mechanically operated grippers and pressed together with their ends either directly or through a third piece of wire of different material in order to effect the welding. With these and other known machines, for example machines for manufacturing the current leads for incandescent lamps consisting of four individual parts and comprising an electrode wire extending from the bulb to the base, a sealing wire fused into the squeezed portion of the base and socket conductor made in conjunction with the socket, only one lead-in conductor is made automatically and no mechanical deformation of the lead-in conductor occurs during the manufacture.

According to the invention, a method for manufacturing lead-in conductors in three parts for the pressed discs of electronic tubes is characterized in that two conduciors are simultaneously manufactured in one process by initially making a center wire section—later forming the contact pins, and to opposite ends of which two further sections are located coaxially in the machine—double the length of a finished contact pin, then heating the center wire section by passing current therethrough and separating it simultaneously by a mechanical tensile stress into two halves followed by the simultaneous production of two lead-in conductors by welding the three parts together in axial alignment.

In the new method of the production, the complete lead-in conductors are made on a single automatic machine. The manufacturing process is divided into seven production stages indicated in the drawings and carried out by the automatic machine in parallel to produce two lead-in conductors simultaneously.

The point at the end of the contact pin which is formed by pulling the double-length section in two, is subsequently ground off to form a truncated cone. Thus a chamfered end is obtained during the manufacture, eliminating a preliminary machining.

A further advantage of the invention is that the lead-in conductor may be made with the technically preferable truncated cone end and the step of separately rolling the ends is eliminated.

Further advantages and characteristics of the invention will be described, by way of example, with reference to the accompanying drawing, in which:

FIG. 1 is a diagram of an automatic machine showing measuring abutments and cutting devices for cutting wire sections from wire reeled off spools, reels or the like, with the corresponding magazines, the wire section for the contact pin having twice the length of the final form (first manufacturing stage);

FIG. 2 shows five cut wire sections in horizontally aligned, electrically conducting pairs of grippers or claws, with annealing of the double length central section for forming the contact pins (second manufacturing stage);

FIG 3 shows the separation of the central section into two halves by controlling the grippers to form two contact pins, a point being formed at the inner end of each contact pin (third manufacturing stage);

FIG. 4 shows the welding of the separated contact pins with the Finkh wires (fourth manufacturing stage);

FIG. 5 shows the welding of the Finkh wires with the long nickel wires, forming two complete lead-in conductors (fifth manufacturing stage);

FIG. 6 shows the grinding of the points at the inner ends of the contact pins to form truncated cones (sixth manufacturing stage);

FIG. 7 shows the ejection of the finished pair of conductors (seventh manufacturing stage);

FIGS. 8 and 8a show the finished lead-in conductors on an enlarged scale;

FIG. 9 is an end view of one of the guide blocks for wire fed from one of the reels;

FIG. 10 is a longitudinal sectional view of the guide block;

FIG. 11 is a plan view of one pair of gripper jaws;

FIG. 12 is an end view of the gripper jaws shown in closed position;

FIG. 13 is a cross sectional view of the gripper jaws shown in open position; and FIG. 14 is a schematic view illustrating movement of the jaws during one cycle of operation and a cam for controlling the opening and closing of the jaws.

An automatic machine contains five bobbins, reels or the like 1 to 5, carrying three different kinds of wire. Bobbin 1 carries a nickel wire of, say, 1 mm. diameter, bobbins 2 and 4 are Finkh wire of say, 0.4 mm. and bobbins 3 and 5 a nickel wire of say, 0.5 mm. Each bobbin is rotatably supported by a suitable axle.

The nickel wire 6 is moved from the bobbin 1 to the center stop 11, for example through a guide block 38 by suitable feed rollers 39 and is cut to the required measurement by a cutter 16. At the same time, the wires 7, 8, 9 and 10 from bobbins 2, 3, 4 and 5 are advanced through guides 40, 41, 42 and 43 towards the center to the adjusted measuring stops 12, 13, 14 and 15, for example by feed rollers 44, 45, 46 and 47 and are simultaneously cut by the corresponding cutters 17, 18, 19 and 20 respectively.

The simultaneously cut five wire sections which are designated 21, 22, 23, 24 and 25 respectively, fall into five collectors or hoppers 26, 27, 28, 29 and 30 and into the symmetrically arranged grippers for further processing.

The nickel wire pin 1 section, (FIG. 2) is gripped at its opposite ends by two pairs of gripper jaws 35, 36. One of the grippers 35 is illustrated schematically in FIGS.

11 to 13 as comprising a pair of jaws 35a and 35b which are pivotally connected with one another by a pivot pin 35c. A tension spring 35d biases the jaws to closed position as shown in FIG. 12. One of the jaws 35b is provided with an operating arm or projection 35e engageable with an operating cam 48 for moving the jaw to open position as illustrated in FIG. 13.

Means is also provided for moving the pairs of gripper jaws physically toward and away from one another in a direction lengthwise of the wire.

The movement of the grippers toward and away from one another during a cycle of operation is illustrated schematically in FIG. 14 where each of the generally vertical lines 31, 32, 33, 34, 35 and 36 indicates the loci of successive positions of the correspondingly numbered grippers. The mechanical movements may be controlled, for example, hydraulically or mechanically, such as by cams. The cam 48 for opening and closing the grippers is also shown schematically in FIG. 14. As illustrated by way of example in the drawings, the grippers are closed from 0° to approximately 180° and are then opened for the rest of the cycle.

At the beginning of a cycle of operations, all of the gripper jaws are closed on the respective wire sections, the central wire section 21, being gripped by two pairs of grippers 35 and 36. The grippers 35 and 36 are then moved away from one another, the gripper jaws 35 being moved towards the right and the gripper jaws 36 towards the left.

Gripper jaws 35, 36 are electrically conducting and are connected to a suitable electric circuit I to cause a predetermined current to flow through the jaws 35 and the nickel wire 21 to the jaws 36. This current heats the nickel wire 21 to incandescence whilst it is being pulled in two by the traction device provided for moving the jaws 35, 36 apart, causing the jaws 35 with half of the nickel wire 21 to be urged toward the jaws 31 and to make contact with the 0.4 mm. Finkh wire 22 while the other half of wire 21 held by jaws 36 is urged against the corresponding wire 24 held by jaws 33.

A further current impulse from the jaws 31 through the wire to the jaws 35 causes the welding of the wire sections 21 and 22. The same occurs simultaneously on the other side, where a current impulse passes through jaws 33 to jaws 36 and causes welding of the wire ends 24 and 21 (FIG. 4, see III).

After the cessation of the current impulses, the jaws 31 and 35 on the one side more toward the jaws 32, and on the other side jaws 33 and 36 more toward the jaws 34 to bring the outer ends of wire sections 22 and 24 into abutment respectively with the inner ends of wire sections 23 and 25 respectively (FIG. 5). A third current impulse from jaw 32 to 31 joins the wire pin ends 22 and 23. At the same time, a current flows from jaws 34 to 33 and welds the wire pin ends 24 and 25 (FIG. 5, see II).

Two flat grinding wheels 37 and 38 machine the points of the wire pins 21 and 22 so that these are slightly ground (FIG. 6) to form ends having the form of truncated cones.

Thereafter, the opening of the jaws 31, 32, 33, 34, 35 and 36 by cam 48 permits the two complete current lead-in assemblies to drop into two hoppers arranged under the jaws and made of clear plastic or the like and so equipped that suitable electronic and optically automatic controls check each pin for length, welding and size of welds and eject all the pins.

After examination for quality control, the pins are electronically counted and automatically packed into prepared boxes of plastic or the like.

Owing to the positive interrelation of the manufacturing stages, the invention results in a considerable increase in the rate of production.

What is claimed is:

1. A process for manufacturing lead-in conductors for electronic tubes, which comprises cutting five sections of wire comprising a center section, two like intermediate sections and two like end sections, heating and tensioning said center section to pull it into two like halves having pointed inner ends formed by necking of the material of said center section where it is pulled in two, butt welding the outer ends of said center halves respectively to inner ends of said intermediate sections respectively to inner ends of said end sections with all of said sections in axial alignment and removing tip portions of said pointed inner ends of said center halves to provide ends having the form of truncated cones.

2. A process according to claim 1, in which removal of said tip portions of the pointed inner ends of said center halves is effected by grinding.

3. A process for manufacturing lead-in conductors for electronic tubes, which comprises feeding wire from five reels into abutment with respective stops, cutting off each of said wires at a predetermined distance from its respective stop to form five wire sections comprising a center section, two like intermediate sections and two like end sections, gripping said center section with first and second pairs of electrically conductive grippers, said pairs being symmetrically spaced apart to leave a central portion of said center section ungripped, passing an electric current through said central portion from one of said gripper pairs to the other to heat said central portion, forcefully moving said gripper pairs apart to pull said center section into two like halves having pointed inner ends formed by necking of the material of said center section where it is pulled in two, gripping said intermediate wire sections respectively with third and fourth pairs of electrically conducting grippers, relatively moving said gripper pairs to bring inner ends of said intermediate sections respectively into abutment with outer ends of said center section halves and passing electric current through said sections to effect welds at said abutments to unite said intermediate sections respectively with said center section halves, gripping said end wire sections respectively with fifth and sixth pairs of electrically conducting grippers, relatively moving said gripper pairs to bring inner ends of said end wire sections respectively into abutment with outer ends of said intermediate wire sections and passing electric current through said sections to effect welds at said latter abutments to unite said end sections respectively with said intermediate sections, removing tip portions of said pointed inner ends of said center section halves to provide ends having the form of truncated cones and releasing said united sections from said gripper pairs.

4. A process according to claim 3, in which said tip portions are removed by bringing said pointed inner ends into engagement with rotating abrasive surfaces.

5. In apparatus for manufacturing lead-in conductors for electronic tubes, the combination comprising means for supporting five reels of wire, abutment means for measuring wire fed respectively from said reels, means for feeding wire from each of said reels into engagement with the respective abutment, cutting means between said abutment means and reels and spaced selected distances from said abutment means to cut wire sections of predetermined length from wire fed from each of said reels, said wire sections comprising a center section, two intermediate sections and two end sections, collector means for receiving each of said sections, gripper means receiving said wire sections from said collectors, comprising first and second pairs of electrically conductive grippers for said center section, third and fourth pairs of electrically conductive grippers for said intermediate sections respectively and fifth and sixth pairs of electrically conductive grippers for said end sections respectively, said gripper pairs being spaced apart and disposed to hold all of said sections in axial alignment with one another, means for passing an electric current through said center section between said first and second gripper pairs to heat said center section, said first and second gripper pairs being movable away from one another to pull said heated center section into two halves having pointed inner ends formed by necking of the material of said center section where it is pulled in two, said third and fourth gripper pairs being movable relatively toward said first and second gripper pairs respectively to bring the inner ends of said intermediate sections into abutment with the outer ends of said center section halves respectively, means for passing an electric current through said latter abutments between said first and third and second and fourth gripper pairs respectively to weld said intermediate sections to said center section halves, said fifth and sixth gripper pairs being movable relatively toward said third and fourth gripper pairs respectively to bring the inner ends of said end sections into abutment with the outer ends of said intermediate sections respectively, means for passing an electric current through said last mentioned abutments between said third and fifth and fourth and sixth gripper pairs respectively to weld said end sections to said intermediate sections and means for removing tip portions of said pointed inner ends of said center section halves to provide ends having the form of truncated cones, all of said gripper pairs being thereafter releasable to release the resulting two lead-in conductors from said gripping means.

6. Apparatus according to claim 5, in which said means for removing said tips comprises grinding means.

7. Apparatus according to claim 5, in which said reels, abutment means, cutting means, collector means and gripping means for said intermediate and end sections are disposed symmetrically with respect to a central plane of said apparatus, the wires for said intermediate and end sections being fed toward said central plane.

8. Apparatus according to claim 7, in which said collector means for said center section is centered with respect to said central plane and said first and second gripper pairs are arranged symmetrically with respect to said central plane.

References Cited

UNITED STATES PATENTS

| | | | |
|---|---|---|---|
| 1,722,195 | 7/1929 | Bumstead et al. | 219—104 |
| 1,842,631 | 1/1932 | Rolle | 219—104 |
| 2,603,735 | 7/1952 | Butler | 219—104 |
| 2,843,724 | 7/1958 | De Gaeta et al. | 219—101 |
| 3,166,665 | 1/1965 | Neukom et al. | 219—104 |
| 3,259,969 | 7/1966 | Tessman | 219—104 |

RICHARD M. WOOD, *Primary Examiner.*

W. D. BROOKS, *Assistant Examiner.*